Oct. 31, 1944.   R. L. PARK   2,361,562
ILLUSTRATED LETTER SHEET
Filed April 13, 1942   2 Sheets-Sheet 1
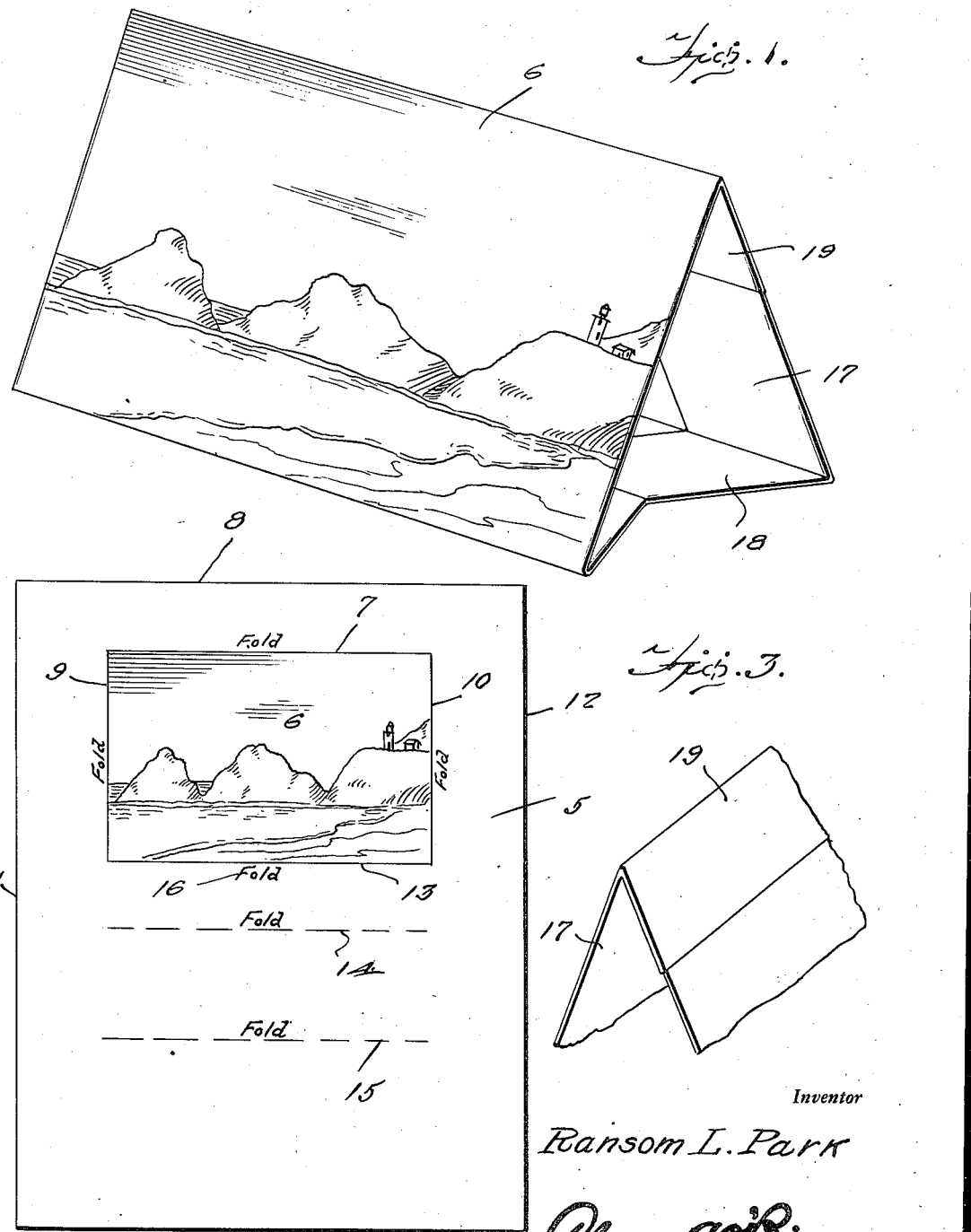
Inventor
Ransom L. Park

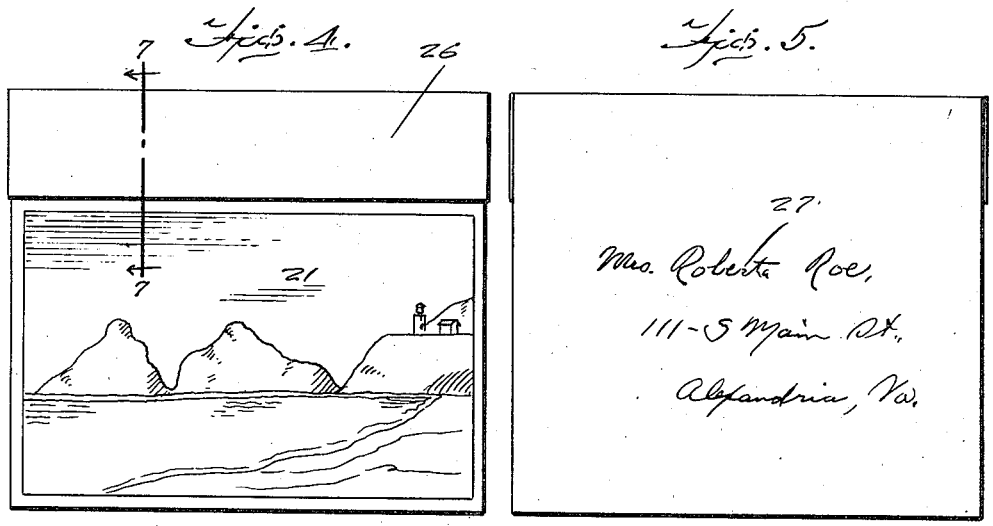
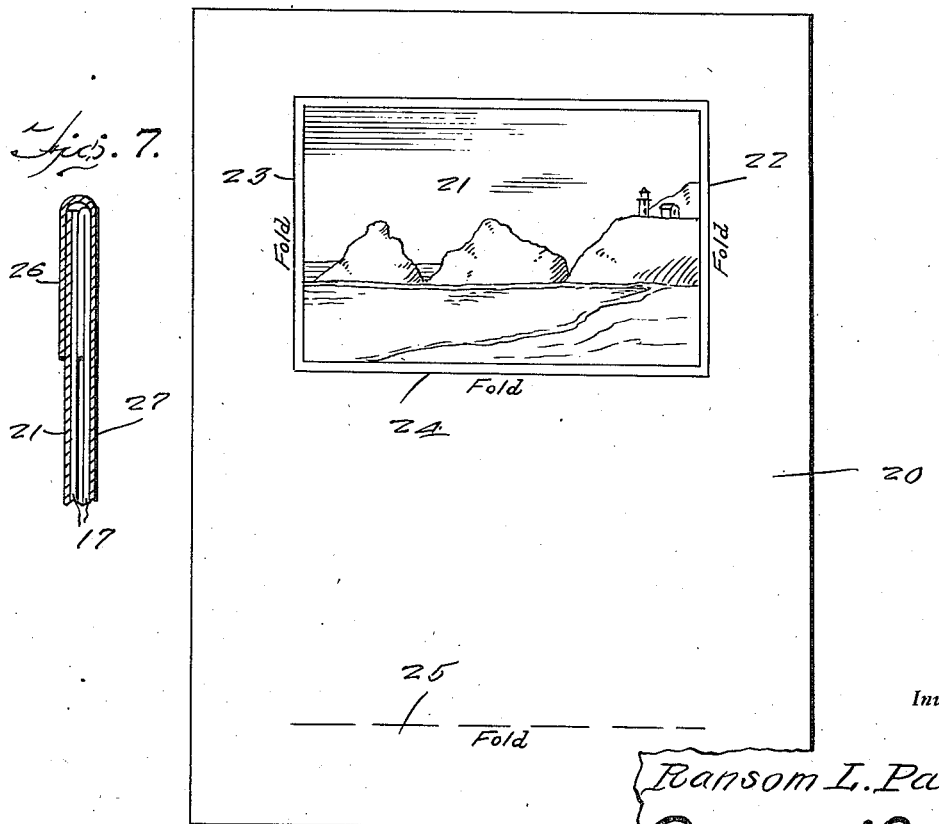

Patented Oct. 31, 1944

2,361,562

UNITED STATES PATENT OFFICE 2,361,562

ILLUSTRATED LETTER SHEET

Ransom L. Park, Monmouth, Oreg.

Application April 13, 1942, Serial No. 438,825

1 Claim. (Cl. 229—92.1)

The present invention relates to new and useful improvements in writing paper or letter sheets and the invention has for its primary object to provide a pictorial illustration on a portion of the letter sheet, preferably on the face thereof, the remaining portion of the face of the letter sheet providing an area for writing a message thereon, together with means for folding the letter sheet so that the illustrated portion and the message portion will be arranged in a substantial back-to-back relation and having means at the free ends of the letter sheet for securing the same in its folded position.

A further object is to provide a letter sheet of this character having fold lines indicated on the face thereof as a guide for folding the letter sheet in a predetermined manner to form a base portion for supporting the illustrated portion of the letter sheet in a manner simulating an easel for the display of the picture thereon.

A further object is to provide an article of this character of simple and practical construction, which is neat and attractive in appearance, relatively inexpensive to manufacture, and otherwise well adapted for the purposes for which the same is intended.

Other objects and advantages reside in the details of construction as more fully hereinafter described and claimed, reference being had to the accompanying drawings forming part hereof, wherein like numerals refer to like parts throughout and in which—

Figure 1 is a perspective view showing the letter sheet folded in the form of an easel for displaying the picture thereon.

Figure 2 is a plan view of the sheet of writing paper with the fold lines indicated thereon.

Figure 3 is a fragmentary perspective view illustrating the manner of securing the free ends of the letter sheet in folded position.

Figure 4 is a rear elevational view of a modified form of illustrated letter sheet in folded position for sending through the mail in the form of an envelope and with the picture shown on the rear thereof.

Figure 5 is a plan view of the address side of the envelope.

Figure 6 is a plan view of the letter sheet having the fold lines indicated thereon for folding in the form of the envelope illustrated in Figures 4 and 5, and Figure 7 is a fragmentary sectional view taken substantially on a line 7—7 of Figure 4.

Referring now to the drawings in detail, and with particularly reference to Figures 1 to 3, inclusive, the numeral 5 designates a sheet of writing paper having a picture 6 printed, or otherwise illustrated or displayed thereon, the picture being arranged adjacent the top of the sheet of paper on the front face thereof and with the top marginal edge 7 of the picture spaced in parallelism below the top edge 8 of the letter sheet and with the side marginal edges 9 and 10 of the picture arranged in spaced relation to the side edges 11 and 12 of the letter sheet.

The bottom marginal edge 13 of the picture is preferably disposed on a transverse line slightly above the medial transverse line of the letter sheet.

A pair of spaced parallel fold lines 14 and 15 are also indicated on the face of the letter sheet below the medial transverse line thereof and the top, bottom and side marginal edges of the picture 6, as well as the fold lines 14 and 15 have printed adjacent thereto the legend "Fold" designated at 16 to indicate that the paper is to be folded on such lines.

Accordingly, by folding the paper in the manner indicated and by folding the sheet along the vertical marginal edges 9 and 10 of the picture backwardly upon itself, side flaps 17 are formed, extending the full length of the sheet, and by folding the bottom portion of the sheet backwardly along the transverse fold lines 13 and 15, a base portion 18 is formed for an easel structure as illustrated in Figure 1 of the drawings, the picture 6 constituting the front of the easel and the lower portion of the sheet constituting the back of the easel.

The upper edge of the sheet is then folded along the transverse line 7 to form a transverse flap 19 including as a part thereof the upper portion of the side flaps 17 adapted to telescope over the upstanding free edge of the bottom portion of the sheet, as will be apparent from an inspection of Figure 1 of the drawings, to secure the top and bottom portions of the letter sheet in its folded position.

By folding the base portion 18 upwardly along the fold line 14, the base may be adjusted to change the angle of display of the picture 6.

Also the fold line 14 provides means for folding the front and back portions of the easel flatwise against each other so that the folded articles may then be inserted in an envelope (not shown) for mailing purposes.

In Figures 4 to 7, inclusive, a modified form of folding the sheet of letter paper, indicated at 20, is provided so that the same may be arranged in the form of an envelope, the front face of the letter sheet having the picture 21 displayed thereon adjacent the top of the letter sheet, as heretofore explained, and the side edges of the letter sheet are folded rearwardly upon themselves along the side marginal lines 22 and 23 of the picture to form the side flaps in the manner previously indicated.

The bottom marginal edge 24 of the picture constitutes the transverse fold line 24 for folding the bottom portion of the letter sheet rearwardly against the back of the picture portion 21 and the bottom portion of the letter sheet is provided with a transverse fold line 25 inwardly from the bottom edge thereof to form an end flap 26 into which the side flaps extend for telescoping over the upper edge of the letter sheet to secure the bottom portion of the letter sheet folded against the back of the picture portion thereof for use as an envelope. The front face of the letter sheet 20, below the picture when in its folded position, then constitutes the front of the envelope adapted to receive the mailing address 27 thereon so that the envelope may then be sent through the mail.

Having thus described the invention, what I claim is:

A letter sheet including an illustrated portion and a message portion, said illustrated portion having its marginal edges disposed parallel to and inwardly of the marginal edges of the sheet adjacent one end thereof, the marginal edges of the illustrated portion defining fold lines for folding the portions of the sheet immediately adjacent the illustrated portion backwardly, said message portion having a transverse fold line in spaced parallelism to the bottom marginal edge of the illustrated portion and positioned substantially midway between the lower marginal edge of the illustrated portion and the bottom edge of the sheet and adapted for folding the message portion to define an easel base and an easel back, the illustrated portion constituting the front of the easel, said base of the easel having a transverse fold line adapted for folding upwardly to adjust the angle of the front, and means at the upper edge of the front back of the easel to secure the same together in folded position.

RANSOM L. PARK.